Nov. 18, 1969  R. J. THELEN  3,479,188
COOKING PROCESS AND PRODUCT
Filed Dec. 30, 1964
FIG. 1
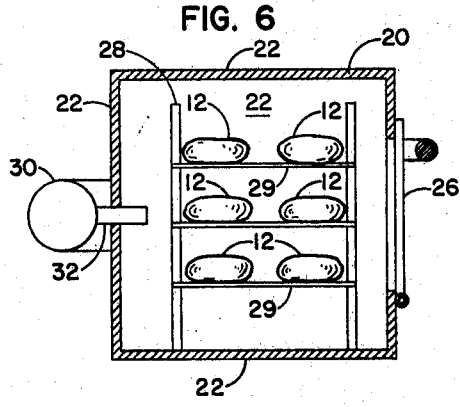
FIG. 2
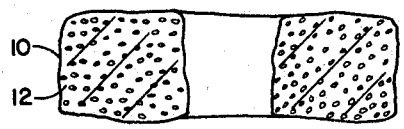
FIG. 3
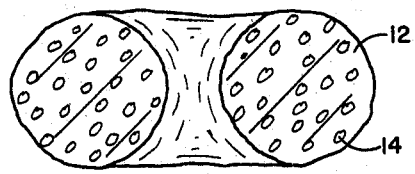
FIG. 4
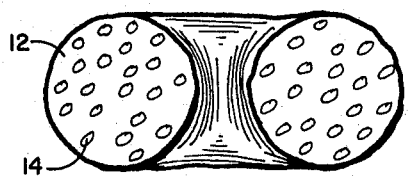
FIG. 5
INVENTOR.
ROMAN J. THELEN
BY United States Patent Office 3,479,188
Patented Nov. 18, 1969

3,479,188
COOKING PROCESS AND PRODUCT
Roman J. Thelen, Minneapolis, Minn., assignor to The Pillsbury Company, Minneapolis, Minn., a corporation of Delaware
Filed Dec. 30, 1964, Ser. No. 422,246
Int. Cl. A21d 13/08
U.S. Cl. 99—86                                            7 Claims

ABSTRACT OF THE DISCLOSURE

A process for cooking a bakery product of the type that is normally fried in deep fat by first subjecting it to microwave energy for a sufficient period of time to allow it to expand and to set the crumb structure of the dough without the presence of a crust, thereafter removing the product from the microwave energy and subjecting it to deep fat frying to brown its surfaces.

---

The present invention relates to the art of cooking and baking foods and more specifically to cooking processes wherein food is heated by means of plurality of successive energy sources. The invention is particularly well suited for cooking farinaceous foods which are normally fried in shortening.

It is widely acknowledged that the preparation of bakery goods or pastry such as doughnuts is a relatively long, involved and time-consuming procedure. Previously, in the case of yeast raised doughnuts, the dough was fermented up to 4 hours, made up and then proofed for a period of about 30 to 45 minutes. The term fermentation as used herein means maintaining the dough under conditions adapted to initiate the growth of yeast usually at a temperature below about 80° F. By proofing is meant sustaining at a temperature of above about 80° F. the growth of yeast which has already been started. Proofing is carried out after the dough hass has been subdivided. If the proofing time is reduced in a conventional baking process, the product tends to be doughy or gummy inside and overdone on the surface. The finished product also tends to be undesirably heavy or dense. Following fermentation the dough is cut, proofed and cooked by frying in hot fat for a period of about two minutes.

Conventional baking processes employed for cooking fried farinaceous products suffer from still other shortcomings. One of these is that cooking, while necessary to develop the crust and enhance flavor, if carried far enough tends to destroy or partially destroy some of the most volatile flavor enhancing materials which are produced in the baking process. Furthermore, conditions must be very carefully adjusted to insure that the inside of the article is done when the outside of the crust has been browned to the proper degree. When this requirement cannot be met the crust will become overdone so that it tends to dry out more readily.

For several years there has been a demand for good quality bakery goods which can be purchased in partially cooked and frozen condition with the final baking performed by the consumer in a conventional kitchen oven. The partially baked products which have been available in the past for this purpose have been in some respects unsatisfactory. They have a surface layer or crust which is slightly more dense than the interior and slightly darker in color. They are sometimes dry on the surface when the final baking operation is completed and often lack high quality flavor or smell of freshly baked bread when completed. Moreover, as far as I am aware, doughnuts and other deep fried pastry products have not been available in a partially cooked form due in part to desiccation, hardening of the surface and flavor loss.

A variety of processes have been previously proposed for cooking farinaceous products. In one prior cooking process frequently referred to as radar or microwave cooking, energy is supplied in the form of radio waves having a frequency of about 2,450 megacycles. The microwave energy is conventionally produced with a megnetron tube connected to a cooking chamber by means of a metal conduit or other wave guide. During operation, microwave energy heats the moisture present in a food article to a temperature at which cooking takes place. When most foods are heated in this manner the inside of the article becomes thoroughly cooked in only a few seconds without browning the surface. This is a disadvantage in the case of farinaceous foods and bakery goods.

As a remedy for this inherent shortcoming of the microwave cooking process, it has been proposed that a hot wire heating element of known construction or in the alternative, a means for generating shallow penetrating microwave radiation, be placed in the oven and operated with the primary microwave generator so as to brown the outside of the article while the inside is cooked with microwave energy. A disadvantage of this arrangement results from the fact that the quantity of energy supplied from each heat source must be carefully balanced so that both the crust and the inside of the article is properly cooked without being overdone when the oven is turned off. This result is often difficult to achieve in view of the fact that most food products are well cooked when heated with microwave energy for a period of from a few seconds to a minute while browning of the crust takes a different period of time if a satisfactory texture and flavor is to be achieved. Moreover, when the center of the food product and crust are cooked simultaneously, the crust which forms will tend to restrict free expansion of the dough.

In another attempt to overcome the tendency for the radar oven to cook only the inside of the article, a material such as carbon particles are sprinkled over the outside of the food which is to be cooked as explained in U.S. Patent No. 2,582,174. According to the patent, microwave energy will be absorbed more readily by the carbon particles than the interior. In this way, the outside is heated at a faster rate to give the surface a toasted appearance. An impotrant disadvantage of this process is the fact that the outside of many foods will be made unattractive or inedible by covering them with carbon particles. This is particularly true of bakery goods.

U.S. Patents 2,942,562 and 3,119,354 show two stage cooking processes which can be used for bread or cookies. These processes are, however, unsuitable for dougnuts previously because of drying that takes place not only from exposure to hot air but also to infrared rays. By contrast, neither of these forms of energy are used in my invention.

The U.S. patent to Gregor, 2,549,595, discloses a method of cooking food products such as rolls and the like at a slow rate in a baking oven until starch gelatinization is complete and the product has assumed the necessary rigidity. The baking is then arrested and the article browned in another oven prior to serving. The method is not, however, applicable to farinaceous products which are normally fried nor is there any indication that the Gregor process would have utility in such use.

The process according to the present invention is begun in the case of yeast-leavened pastry by mixing the dough after which the dough is proofed or fermented. In the case of a chemically leavened dough, no proofing is required. The structure is established immediately after proofing by subjecting the dough to microwave energy sufficient to set the crumb. When the crumb has been set, the dough becomes a resilient and self-supporting structure. It is not normally subject to flow and exhibits no tackiness. The dough is not, however, cooked for a period of time sufficient to cause any detectible hardening or darkening of the surface. According to one form of the invention, the resilient and self-supporting product thus formed is then immediately frozen for shipment or storage. In the final step of the process, the exterior of product is heated by a cooking method in which heat is transferred to the surface by conduction for a sufficient period of time to brown the outside surface of the article.

In view of the deficiencies of the prior art, it is one object of the present invention to provide an improved doughnut cooking process wherein the finished product has a highly desirable texture and flavor.

It is yet another object of the invention to provide an improved doughnut cooking process wherein the time required for proofing or fermentation and for baking is substantially reduced without adversely affecting either the taste or texture of the finished product.

Yet another object of the invention is the provision of an improved cooking process suitable for deep fat dried products such as doughnuts wherein the penetration of fat into the fried article is reduced.

Yet another object of the invention is the provision of an improved doughnut cooking process for preparing partially cooked baked goods to be shipped in a frozen condition.

A further object of the invention is the provision of an improved doughnut cooking process wherein the degree to which both the inside and the outside of the article is cooked can be accurately controlled to thereby improve product quality and uniformity.

These and other more detailed and specific objects will become apparent from the following specification and drawings wherein:

FIGURE 1 is a flow chart illustrating the steps performed in accordance with the invention;

FIGURE 2 is a semi-diagrammatic cross-sectional view of the dough before it has been proofed;

FIGURE 3 is a cross-sectional view on the same scale as FIGURE 2 after the doughnut has been cut and proofed;

FIGURE 4 is a cross-sectional view on the same scale as FIGURES 2 and 3 following cooking with microwave energy;

FIGURE 5 is a cross-sectional view on the same scale as FIGURES 2 through 4 after the final cooking step has been performed; and FIGURE 6 is a vertical sectional view of a microwave oven containing articles to be cooked.

The invention will now be explained by way of example in connection with the cooking of raised doughnuts as seen in FIGURES 1 through 6. It should, however, be understood that the invention is equally applicable to all fat fried farinaceous foods such as twists, pershings, jelly delights, bismarks and others. To begin the operation, flour, water, sugar, shortening, salt and yeast are mixed together in the usual proportions to form a dough. The composition for a typical doughnut dough comprises flour, 100 parts by weight; water, about 50 to 70 parts and preferably 56 to 62 parts by weight; shortening, about 2 to 12 parts and preferably 8–10 parts by weight; leavening, about 1 to 10 parts by weight; and sugar about 4 to 40 parts and preferably 5–8 parts by weight; and salt, about 1 to 2½ parts by weight. Seasoning and other common ingredients such as nonfat dry milk and emulsifiers can be used as required.

The dough designated 10 in FIGURE 2 is kneaded by hand or with the customary machinery for frrom about ½ to 5 minutes or until it is fully developed. Fermentation of the dough 10 is then allowed to proceed for a period of about 1 to 2 hours (4 hours if a sponge and dough system is employed). The dough 10 is then cut to the form of a doughnut 12 and placed in a proofing box (not shown) having a temperature of about 90–105° and a relative humidity of about 80%. Outstanding results are obtained using the invention with a proofing period of as little as 10–15 minutes. It will be understood that if the dough is proofed at higher temperatures, somewhat less time will be required to achieve the same gas formation.

As can be seen by reference to FIGURE 2, the dough 10 is relatively dense before proofing. It is non-self-supporting, fluid and tacky. After being allowed to ferment, the cut doughnut 12 of FIGURE 3 contains a myriad of gas cells 14 which may vary in size up to about one millimeter in diameter.

As shown in FIGURE 6, the proofed and cut doughnut 12 is placed in a microwave oven 20 of a conventional known construction. While any of various microwave ovens are satisfactory, a Ratheon® Model Mark V oven having a radio frequency output rating of about 1,600 watts and frequency of about 2,450 megacycles will be satisfactory. In large scale continuous production a microwave oven having a conveyor therein to carry food products through it is preferred. As can be seen in the figure, the oven includes side, top and bottom walls 22 and a front wall 24 having a door 26. Inside is a rack 28 formed from a material which will neither absorb nor reflect microwave energy. Trays 29 of a similar material are used to support the proofed doughnuts 12. At the rear of the oven is a microwave generator 30 and a wave guide 32 communicating with the interior of the oven.

Microwave energy is then supplied to the cooking chamber of the oven for the period of time necessary to heat the interior of the doughnut 12, expand the cells 14 and set the crumb, but not for sufficient time to substantially dry the inside of the article or cause a browning or hardening of the outside surface. This result will generally take place in a period of from about 5 to 30 seconds. The appropriate time will depend upon the power output of the microwave generator, the wave length of microwave energy used and the amount of moisture in the article being cooked as well as other factors which will be apparent to those skilled in the art. Generally, I have found that from about 8,000 to 48,000 watt seconds and preferably between about 11,200 to 19,200 watt seconds will be satisfactory. The most important requirement is that the article 12 be cooked enough to be self-supporting, resilient, nonfluid and nontacky to the touch but without becoming brown on the outside or tough in the interior. The product will then contain about 25–35% moisture. The product is then optionally frozen prior to shipment or storage. Since freezing is carried out after the crumb has been set, very little volume loss is experienced.

Finally, the surface of the product is browned by the application of heat to the exterior only. The amount of heat and time required for heating will vary widely for different products. In the case of doughnuts browned by frying in hot fat, at a temperature of about 350 to 500° F., the frying time should be between about 5 to 25 seconds. Ten seconds on the first side and 8 to 10 seconds on the second side was found to product satisfactory results.

In accordance with an alternative form of the invention, a preblender flour containing sugar, shortening, eggs, salt, nonfat dry milk and other usual ingredients is admixed with water and a chemical leavening agent rather than yeast. Any of various chemical leavening agents known to the art such as baking soda and an acidulant can be employed. In the event this alternative form of the invention is used no proofing is, of course, required. Instead, the dough is simply cut to the desired shape and subjected to microwave energy as described above. As the microwave energy is supplied, carbon dioxide gas is evolved causing the product to rise until the crumb is set as described above.

It was found that any suitable commercially acceptable dough composition can be employed in connection with the present invention. From the evaluations carried out, it does not appear that a special dough formulation is required. To the basic dough composition can be added any coloring or flavoring desired to produce the desired results. Fruist such as raisins or blueberries and the like can also be added if desired. As mentioned above, the dough composition can include either a yeast or chemical leavening agent.

In the fermentation process, the yeast reacts with the sugar present to form carbon dioxide, alcohol and a variety of other reaction products in minor amounts. The carbon dioxide evolved forms cells which expand as carbon dioxide is generated. As the fermentation continues, the gas cells begin to coalesce, thereby forming smaller number of relatively large vesicals. If the process is allowed to proceed too far, a substantial amount of entrapped gas may be lost due to leakage through the exposed surface of the dough mass. Previously, it was necessary to allow the fermentation process to proceed almost to the point of gas loss in order to achieve satisfactory results when the pastry is baked. When the present invention is employed, it was discovered that fermentation process need not be carried on for nearly as long a time. In fact, good results can be achieved with a fermentation time of 1 hour 20 minutes and a dough volume increase of about 100% in the case of raised doughnuts as compared with the period of fermentation time of about 2 to 4 hours and a doughy volume had an increase of about 200% in the case of conventional baking. The difference in the total time required for fermentation is believed to be due at least in part to the uniform heating of the product by microwave energy and ability of the dough to expand freely since there is no crust formed during the first stage of cooking which if present would restrict the expansion of the dough.

As explained previously, the microwave cooking is carried out until the crumb is set. By this is meant that substantially all of the starch has been gelatinized and the protetin denatured. The physical result is that the dough is no longer fluid but instead is self-supporting, resilient and can be broken into crumbs. In the production of doughnuts and the like, the denaturation of gluten is important while in the baking of cakes, the gelatinization of starch will be of the greatest significance. Cooking should not be carried to the point at which the inside is dried or the surface becomes brown. Following the initial cooking step the surface is soft, pliable, resilient, smooth and is neither dried nor cooked to a greater extent than the center.

The power output of the microwave oven is not considered critical. Any satisfactory commercially available microwave oven will be suitable. Generally, the greater the power output, the shorter will be the time required for completing the cooking operation. By the same token, the frequency of the microwave energy will affect the efficiency with which the energy is absorbed by the product being cooked. For the purposes of the invention, microwave radiation having a frequency of about 2,450 megacycles and a power of about 1,600 watts will be satisfactory but should not be considered limiting. In an oven of the type described and operating at a frequency of 2,450 megacycles, a cooking time of about 7 to 12 seconds is preferred for most purposes. If the cooking time is too short, the finished product had a gummy or soggy consistency. If the time is too great, the interior will be tough or dried.

Following the initial cooking step, the product is optionally frozen and the cooking completed at a later time. Since freezing follows setting of the crumb, I find that negligible shrinkage takes place. Where the complete cooking operation is performed by the manufacturer, the product is cooked by heating the outside surface immediately succeeding the initial cooking step. A substantial amount of time can be saved in preparing doughnuts since the cooking operation can be completed in about 5–10 seconds on the first side and about 5–25 seconds on the second side with fat frier held at a temperature of about 425° F. Of course, when the required cooking time is reduced, production speeds can be increased thereby reducing the cost of capital equipment as well as operating costs. A further important feature of the invention is the fact that since the doughnuts are deep-fat fried for a shorter period of time, less fat is absorbed by the doughnuts which is desirable since a lighter and more palatable doughnut will result. It should also be noted that in my process, before frying is started the starch has been gelatinized and protein denatured. This is an additional reason for the fact that the doughnuts absorb and bind less fat.

The invention has a variety of advantages. First, shelf life is extended due to the uniformity of heating and resultant more complete gelatinization of starch. A further advantage is the fact that during the initial cooking step, the temperature of all parts of the article being cooked can be carefully controlled. As a result, hot spots are prevented which if present tend to destroy volatile flavor enhancing compounds. The flavor of the articles produced by the invention is therefore better than that produced in a conventional baking process as judged by standard taste tests. Moreover, in preparing doughnuts and other fried foods, substantially less fat is absorbed by the product than in the case of conventional cooking. In addition to these advantages, the shorter cooking time required reduces production costs.

A further advantage of the invention is the fact that the finished products have a greater volume when starting with the same amount of dough than products cooked conventionally. They can also be made with a thinner and more delicate crust. The degree to which both the inside and outside of an article is cooked can be carefully controlled. Since each step is performed separately, there will always be an opportunity to eliminate the condition in which the inside of the article is undercooked and the outside is overcooked.

The invention will be more readily understood by reference to the following examples.

EXAMPLE 1

A composition using any suitable standard dough formulation containing the usual components including flour, shortening sugar, salt and a leavening agent is mixed together in a mechanical or hand mixing technique. Following mixing, the formulation is allowed to ferment at room temperature for about 1½ hours. The dough is then divided into easily handled pieces and fermentation is allowed to continue for 25 minutes at room temperature.

Doughnuts are then cut from the dough with a 2½ inch cutter and are allowed a proofing time of about 10 minutes in a proofing box maintained at a temperature of about 95° F. and a relative humidity of about 80%.

The proofed doughnuts are placed on a sheet of material which will neither absorb nor reflect microwave energy and hereinafter for convenience referred to as "inactive." The doughnuts are then placed in a suitable microwave oven such as a Raytheon Mark V oven having a radio frequency output rating of about 1,600 watts and frequency of about 2,450 megacycles.

The microwave oven is turned on and allowed to operate for a period of 7 seconds. During this time the dough is heated sufficiently to expand the gasses present therein and increase the volume of the doughnuts substantially as well as to set the crumb i.e. cause gelatinization of the starch and denaturation of the proteins. After this has been done the doughnuts have no crust. They are light in color on the exterior. The dough is resilient, non-fluid and exhibits no tackiness. The doughnuts are then transferred to a deep-fat fryer of a suitable known construction which is heated to a temperature of about 475° F. for a period of about 10 seconds on the first side and about 10 seconds on the second side.

The resulting doughnuts are characterized by high volume, light weight and have a tender crust. The doughnuts have a highly acceptable taste and texture as determined by standard taste tests. Fat absorbtion is less than doughnuts having an equal volume if made by conventional cooking procedures. The internal crumb structure has a silkier feel and finer grain structure.

EXAMPLE 2

A doughnut dough having the following composition is mixed in a Hobart vertical mixer to full development i.e. the dough is smooth and pliable and can be stretched without tearing.

|  | Parts |
|---|---|
| Flour | 100.00 |
| Water | 60.80 |
| Shortening with freshness preservative | 9.54 |
| Sugar | 6.04 |
| Yeast | 6.55 |
| A mixture of about 42% alpha monoglycerides and 38% other mono and diglycerides | 2.54 |
| SAAP 40 | .852 |
| Soda | .611 |
| Nonfat dry milk | .509 |
| Coloring | .636 |
| Salt | 1.91 |

The temperature of the water is adjusted so that the mixed dough temperature will be 80° F.

The dough is allowed to ferment for 1½ hours at room temperature. The dough is then divided into easily handled pieces and fermentation is continued at room temperature for 25 minutes.

The dough is sheeted and the doughnuts are hand cut with a 2½ inch cutter. The doughnuts are scaled at 1 once per doughnut.

The cut doughnuts are then allowed to proof for about 20 minutes in a proof box held at between about 95 and 98° F. and a relative humidity of about 80%.

The proofed doughnuts are placed in an inactive supporting material and transferred to a Rathyeon Mark V microwave oven having a 1,600 watt output and operating at 2,450 megacycles for a period of 6 seconds. The doughnuts are withdrawn from the oven and placed immediately within a deep fat fryer of a suitable type set at a temperature of about 425° F. for a period of 10 seconds on each side.

The resulting doughnuts have a very acceptable taste and texture. They are characterized by having a relatively low fat content and a high volume. The grain of the internal crumb is very fine and the texture of the crust is excellent.

EXAMPLE 3

A dough for making twists and having the following composition was mixed in a Hobart vertical mixer to full development, i.e. the dough is smooth and pliable and could be stretched without tearing.

|  | Parts |
|---|---|
| Flour | 100.00 |
| Water | 60.80 |
| Shortening with freshness preservative | 9.54 |
| Sugar | 6.04 |
| Yeast | 6.55 |
| A mixture of about 42% alpha monoglycerides and 38% other mono and diglycerides | 2.54 |
| SAAP 40 | .852 |
| Soda | .611 |
| Nonfat dry milk | .509 |
| Coloring | .636 |
| Salt | 1.91 |

The temperature of the water is adjusted so that the mixed dough temperature will be about 80° F. The dough is allowed to ferment for 1½ hours at room temperature. The dough is then divided into easily handled pieces and fermentation is continued at room temperature for 25 minutes. The dough is then sheeted and the twists are hand cut with a suitable cutter and are allowed to proof for about 20 minutes in a proof box held at between about 95 and 98° F. and a relative humidity of about 80%.

The proofed twists are then placed on an inactive supporting material and transferred to a Rathyeon Mark V radar range having a 1,600 watt output and operating at 2,450 megacycles for a period of 20 seconds. The twists are then withdrawn from the oven and placed immediately in a deep fat dryer of a suitable type set at a temperature of about 350° F. for a period of 15 seconds on each side.

The resulting twists have a very acceptable taste and texture. They are characterized by having a relatively low fat content and a high volume. The grain of the internal crumb is very fine and the texture is excellent.

EXAMPLE 4

A pershing dough having the following composition is mixed in a Hobart vertical mixer to full development.

|  | Parts |
|---|---|
| Flour | 100.00 |
| Water | 60.80 |
| Shortening with freshness preservative | 9.54 |
| Sugar | 6.04 |
| Yeast | 6.55 |
| A mixture of about 42% alpha monoglycerides and 38% other mono and diglycerides | 2.54 |
| SAAP 40 | .852 |
| Soda | .611 |
| Nonfat dry milk | .509 |
| Coloring | .636 |
| Salt | 1.91 |

The temperature of the water is adjusted so that the mixed dough temperature will be about 80° F. The dough is allowed to ferment for 1½ hours at room temperature and is then divided into easily handled pieces and fermentation is continued at room temperature for 25 minutes. The dough is then sheeted and the pershings are hand cut with a suitable cutter. The pershings are scaled at 1 ounce per pershing.

The proofing step carried out in the examples above was omitted.

The pershings are then placed on an inactive supporting material and transferred to a Rathyeon Mark V radar range having a 1,600 watt output and operating at 2,450 megacycles for a period of 6 seconds. The pershings are then withdrawn from the oven and placed immediately within a deep fat fryer of a suitable type set at a temperature of about 425° F. for a period of 10 seconds on each side.

The resulting pershings have a very acceptable taste and texture and are characterized by a relatively low fat content and a high volume. Although the optimum volume is not obtained when the proofing step is eliminated, the volume is considered acceptable.

EXAMPLE 5

A dough having the composition of Example 2 is mixed in a Hobart vertical mixer to full development.

The temperature of the water is adjusted so that the mixed dough temperature will be about 80° F. The dough is allowed to ferment for 1½ hours at room temperature. The dough is then divided into easily handled pieces and fermentation is continued at room temperature for 25 minutes. The dough is then sheeted and bismarks are cuts conventionally and proofed as in Example 2 but for a period of 10 minutes.

The bismarks are then placed on an inactive supporting material and transferred to a Rathyeon Mark V radar range having a 1,600 watt output and operating at 2,450 megacycles for a period of 6 seconds. The bismarks are then withdrawn from the oven and placed immediately within a dep fat fryer of a suitable type set at a temperature of 425° F. for a period of 10 seconds on each side. The resulting bismarks have a very acceptable taste and texture and are characterized by having a relatively low fat content and a high volume.

delights, the latter being similar to a doughnut but having no cutaway portion at the center. The resuling products are satisfactory as judged by standard taste tests and exhibit a light and fluffy dough texture and a relatively high volume.

EXAMPLE 8

A dough composition is mixed, fermented, proofed and cooked as set forth in Example 2 above except for the variations set forth in Table I below.

As can be seen in Table I, the doughnuts which were run in the microwave oven were proofed for 15 minutes and placed in the microwave oven for 10 seconds. The controls which were not cooked in the microwave oven were proofed for 20 minutes. The table shows that the fat absorption was less in the case of the doughnuts cooked in the microwave oven in spite of their larger volume and surface area.

EXAMPLE 9

A dough composition is mixed, fermented and proofed as shown in Example 2 except for the proofing, cooking and frying times which is set forth in Table II below.

TABLE I

|  | Proof (min.) | Microwave oven (sec.) | Frying time, 400° F. (sec. per side) | Fat Abs., percent by wt. | Specific vol. (cc./g.) | Donuts fried | Shelf life |
|---|---|---|---|---|---|---|---|
| Microwave oven | 15 | 10 | 20 | 14.40 | 5.18 | 47 | Better than average. |
| Control | 20 | None | 55 | 15.65 | 4.21 | 47 | Average. |

TABLE II

|  | Proof (min.) | Microwave oven (sec.) | Frying time, 400° F. (sec. per side) | Fat Abs., percent by wt. | Specific vol. (cc./g.) | Donuts fried | Shelf life |
|---|---|---|---|---|---|---|---|
| Microwave oven | 15 | 10 | 20 | 18.30 | 5.74 | 59 | Better than average. |
| Control | 20 | None | 55 | 23.06 | 5.36 | 70 | Average. |

EXAMPLE 6

A cake doughnut dough formulation having the composition given below is blended together and mixed conventionally.

|  | Parts |
|---|---|
| Wheat flour | 100.00 |
| Water | 61.37 |
| Sugar | 41.10 |
| Potato flour | .51 |
| Soy flour | .307 |
| Cottonseed flour | .58 |
| Corn sugar | 3.40 |
| SAAP 28 | .56 |
| SAAP 40 | .13 |
| Soda | 1.39 |
| Nonfat dry milk | 7.47 |
| Dried egg yolk | 2.55 |
| Lecithin-oil mixture | 1.19 |
| Salt | 1.7 |
| Vegetable shortening | 5.54 |

The dough is sheeted to the desired thickness and cut with a 2½ diameter doughout cutter. The cut doughnuts are placed on an inactive support member and placed in a Rathyeon Mark V oven of the type described for a period of 15 seconds. They are then removed and fried in a suitable deep fat fryer at a temperature of 375° F. for a period of 10 seconds on each side. The doughnuts thus produced are light and the dough has a fluffy and smooth texture. They also exhibit at lower fat absorbtion than the corresponding doughnuts made by conventional cooking prcedures.

EXAMPLE 7

Using the dough composition and mixing procedure, proofing and cooking procedure of Example 2, the invention is employed for making longjohns, knots and jelly As in Example 8 the volume of the doughnuts was greater but the fat absorption is substantially less and the shelf life greater in the case of the doughnuts cooked in accordance with the invention.

EXAMPLE 10

A dough composition is made up in the same manner as in Example 2. The dough is proofed and cooked in the microwave oven in the same manner as set forth in Example 2 and are quick frozen in a freezer having a temperature of −20° F. The frozen doughnuts are maintained in storage and 0° F. for as long as desired. They are then removed from the freezing cabinet, allowed to thaw for a period of about 20 minutes at room temperature or are placed immediately in a suitable deep fat fryer for period of 20 seconds on each side at a temperature of 400° F.

The doughouts exhibit a greater volume than the doughnut produced in accordance with the prior art. Since the crumb has been set before freezing, very little volume reduction is experienced in the freezing operation. The doughnuts exhibit less fat absorption than similar doughnuts manufactured conventionally and have a satisfactory taste and texture as determined by standard taste tests.

I claim:
1. A cooking process comprising the steps of:
subjecting uncooked dough for a fat fried farinaceous leavened food article to sufficient microwave energy for a period of time sufficient to heat the interior of the product, expand the cells and set the crumb structure, but not for a sufficient time to toughen, the exposed surface thereof; and
subsequently frying the food article in hot fat sufficiently to cook the outside and darken the color of the exposed surface thereof, whereby the penetra- tion of hot fat into the article is reduced and an increase in volume is obtained.

2. The process according to claim 1 wherein the leavened food articles are frozen after their crumb structure has been set and prior to frying in fat.

3. The process according to claim 1 wherein the article is formed from a yeast leavened dough by mixing, fermenting and proofing the dough prior to subjecting it to microwave energy.

4. The process according to claim 1 wherein the food article is immersed in the fat heated to a temperature from about 350° F. to 375° F. for a period of from about 5 to 25 seconds.

5. The process according to claim 1 wherein the microwave energy has a frequency of about 2,450 megacycles.

6. A process for cooking farinaceous foods of the type normally cooked in deep fat comprising in combination mixing together about 100 parts by weight of flour, from about 50 to 75 parts by weight of water, from about 2 to 10 parts by weight of shortening, from about 1 to 10 parts by weight of leavening, about 1 to 3 parts by weight of salt and about 5 to 40 parts by weight of sugar to form a dough, exposing the dough after fermentation to microwave energy on the order of about 2,450 megacycles in the amount of about 8,000 to 48,000 watt seconds for a period of time sufficient to heat the interior of the product, expand the cells and until the crumb is set, but not for a sufficient time to toughen the exposed surface; discontinuing heating with microwave energy; and, thereafter, placing the article in hot fat at a temperature of from about 350° to 475° F. for a period of time sufficient to brown the external surface thereof without substantially cooking the inside.

7. A process for cooking doughnuts comprising mixing together about 100 parts by weight of flour, from about 50 to 70 parts by weight of water, from about 2 to 10 parts by weight of shortening, from about 1 to 10 parts by weight of yeast, about 1¾ to 2¾ parts salt, about 6–24 parts sugar and about 3–5 parts nonfat dry milk, working said products to form a dough, allowing the dough to ferment for a period of from about 1 to about 4 hours, exposing the dough after fermentation to microwave energy on the order of about 8,000 to 48,000 watt seconds until the crumb is set but not for a sufficient period of time to toughen or darken the color of the exposed surface thereof, discontinuing heating with microwave energy thereafter placing the doughnuts in fat at a temperature of from about 350° F. to about 475° F. for a period of time sufficient to brown said surface without substantially cooking the inside thereof.

References Cited

UNITED STATES PATENTS

| 2,092,160 | 9/1937 | Hawerlander | 99—86 |
| 2,340,354 | 1/1944 | Wells | 107—54 |
| 2,454,370 | 11/1948 | Beaubien | 107—54 XR |
| 2,997,566 | 8/1961 | Pierce et al. | |
| 3,271,552 | 9/1966 | Kragewiski. | |

FOREIGN PATENTS

| 902,412 | 8/1962 | Great Britain. |
| 1,106,713 | 5/1961 | Germany. |

OTHER REFERENCES

American Society of Bakery Engineers, 1959, pp. 271–275.

RAYMOND N. JONES, Primary Examiner

U.S. Cl. X.R.

99—92